United States Patent

[11] 3,621,981

[72] Inventors: Philip E. Nimmo, Jr. Wayne; Richard A. Townsend, Rockaway, both of N.J.
[21] Appl. No. 11,177
[22] Filed Feb. 13, 1970
[45] Patented Nov. 23, 1971
[73] Assignee Sun Chemical Corporation New York, N.Y.

[54] AUTOMATIC BOW FEEDING APPARATUS
10 Claims, 1 Drawing Fig.

[52] U.S. Cl. .................................................. 198/40, 198/110, 198/102
[51] Int. Cl. .................................................. B65g 43/00, B65g 37/00
[50] Field of Search .................................................. 198/39, 40, 110, 102, 45, 43, 59, 60, 30; 250/223; 53/78, 59

[56] References Cited
UNITED STATES PATENTS

| | | | |
|---|---|---|---|
| 2,523,517 | 9/1950 | Potter | 198/30 |
| 3,535,847 | 10/1970 | Strohmeier | 53/59 |
| 2,632,588 | 3/1953 | Hoar | 53/59 |
| 2,962,150 | 11/1960 | Haley | 198/39 |

Primary Examiner—Richard E. Aegerter
Attorney—Cynthia Berlow

ABSTRACT: Automatic apparatus for the feeding of soft lightweight ornamental articles, such as bows formed from ribbon, includes a hopper wherein the articles are loaded in random fashion. A primary shuffler constituting the bottom wall of the hopper is reciprocated in a horizontal plane to deliver the articles in a forward direction to a secondary shuffler also reciprocated in a horizontal plane. A first photoelectric device automatically halts reciprocation of the primary shuffler when there is a pileup of articles on the secondary shuffler. The secondary shuffler delivers the articles to the wide-mouthed upper end of a downwardly extending chute having converging sides which terminate in a relatively narrow mouth. A transformer-type vibrator vibrates the chute with very short rapid strokes directed along the longitudinal axis of the chute. Articles tumble from the discharge end of the chute onto a continuous belt transfer conveyor, which delivers the articles to a continuous belt delivery conveyor located adjacent to and in axial alignment with the transfer conveyor. A second photoelectric device deactivates the transfer conveyor whenever there is a pileup of articles at the boundary between the transfer and delivery conveyors. A third photoelectric device deactivates the delivery conveyor each time the latter delivers a predetermined number of articles (one or more) to a loading mechanism, with the delivery conveyor being reactivated in response to the condition of the loading mechanism.

PATENTED NOV 23 1971 3,621,981
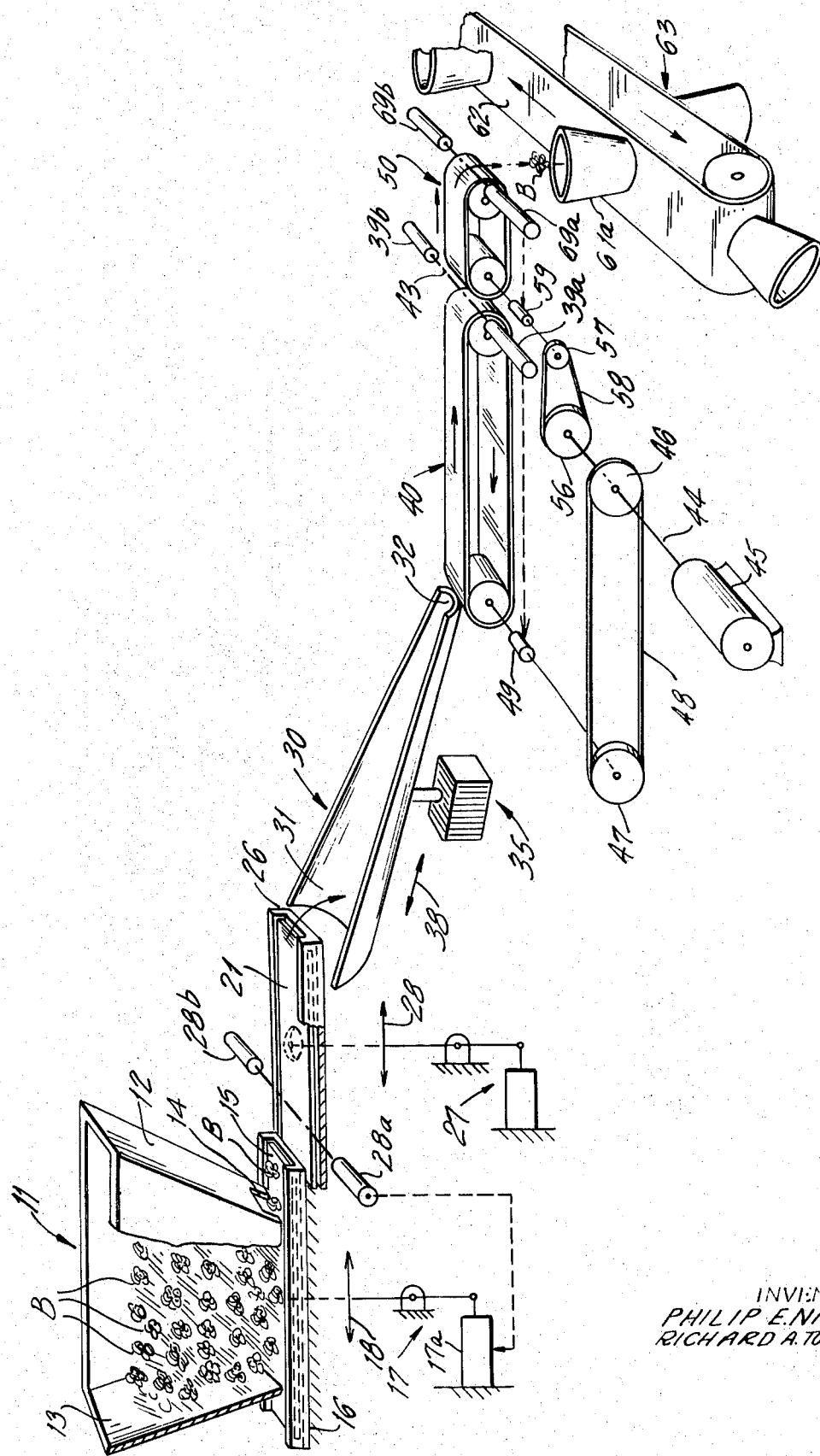
INVENTOR.
PHILIP E. NIMMO, JR.
RICHARD A. TOWNSEND

AUTOMATIC BOW FEEDING APPARATUS

This invention relates to automatic-feeding apparatus in general and more particularly relates to automatic apparatus for controlled feeding of soft lightweight ornamental articles such as bows.

Machinery is presently available for the automatic high-speed production of bows from ribbon. Very often the bows are sold to the consumer in packages containing a precise number of bows and very often this number includes bows of differing bows. Packaging is accomplished by transferring the bows from a bulk-loaded hopper, holding a single color and/or single style of bow, into a container of a loading mechanism. When the container is loaded with the desired quantity of bows of each desired style and/or color, the contents of the container are dumped into the final package.

In the prior art, rapid loading of the container with a precise count presented a number of problems. For example, in one prior art mechanism the bows, upon leaving the supply hopper, were arranged in single file on a continuously moving conveyor. A reciprocating kicker removed the bows one at a time from the conveyor. Because the bows were relatively soft and lightweight, and possibly more important because they were constructed of resilient material, it often required more than a single stroke of the kicker to remove a single bow from the conveyor. Such multiple strokes serve to unduly slow down operation of the apparatus.

The instant invention overcomes the above-noted disadvantage of prior art apparatus by providing an automatic-feeding apparatus that utilizes a continuous conveyor belt for controlled delivery. A photoelectric device counts each article as it leaves the delivery conveyor and automatically deactivates the delivery conveyor which remains deactivated until receipt of an appropriate signal from a loading mechanism which receives articles from the delivery conveyor. A continuous belt transfer conveyor, operating at a slower speed than the delivery conveyor, transfers articles from a supply means to the delivery conveyor. Additional photoelectric devices strategically positioned behind the delivery conveyor automatically deactivate the transfer conveyor or other appropriate portions of the supply section should a pileup of bows develop.

Accordingly, a primary object of the instant invention is to provide improved high-speed accurate-counting automatic apparatus for feeding of bows to a loading and packaging mechanism.

Another object is to provide automatic feeding apparatus of this type in which the final delivery conveyor is a continuous belt whose movement is stopped each time a predetermined number (one or more) of articles is delivered.

Still another object is to provide apparatus of this type in which there are aligned transfer and delivery conveyor belts positioned in tandem, with the transfer conveyor being operated at a substantially slower speed than the delivery conveyor.

A further object is to provide automatic apparatus of this type in which photoelectric devices are utilized to control actuation and deactuation of conveyors in a controlled manner.

A still further object is to provide automatic apparatus of this type in which the individual feeding units are relatively narrow, thereby permitting a large number of units to be arranged in a side by side array in a relatively small area.

These objects as well as other objects of this invention will become readily apparent after reading the following description of the accompanying drawing. The single FIGURE is a perspective, in diagrammatic form, illustrating a single unit of an automatic bow feeding apparatus constructed in accordance with teachings of the instant invention.

Now referring to the FIGURE. Automatic feeding apparatus constructed in accordance with teachings of the instant invention includes open top supply hopper 11 wherein bows B are bulk loaded in random fashion. The relatively narrow front and rear walls 12, 13 of hopper 11 converge from fler 15, forming the bottom wall of hopper 11, is guided for reciprocating movement in a horizontal plane by track support 16 having a U-shaped cross section with relatively short arms. Oscillator mechanism 17 reciprocates primary shuffler 15 to the left and right as indicated by double-ended arrow 18.

Oscillator mechanism 17 is constructed of a double-acting air cylinder 17a. The exhaust openings of air cylinder 17a are adjusted so that rearward movement of primary shuffler 15 (to the left with respect to the FIGURE) is much more rapid than forward movement of primary shuffler 15. The net effect of this motion is to cause bows B to be withdrawn from hopper 11 through discharge opening 14 thereof and to be pushed to the right, tumbling from the forward end of primary shuffler 15 to secondary shuffler 21 at the rear thereof.

Secondary shuffler 21 is mounted for reciprocating movement in a horizontal plane, being guided by U-shaped support 26 in the same manner that primary shuffler 15 is guided by support 16. Oscillator mechanism 27, of substantially the same construction as oscillator mechanism 17, reciprocates secondary shuffler 21 along its longitudinal axis as indicated by double-ended arrow 28. The relatively slow forward movement and relatively fast rearward movement of secondary shuffler 21 causes bows B to be moved in a forward direction, dropping from the forward end of secondary shuffler 21 on to chute 30 at the rear raised entrance end 31 thereof. Chute 30 is downwardly inclined with entrance end 31 thereof being relatively wide and discharge end 32 thereof being relatively narrow, with the curved sides of chute 30 tapering gradually between ends 31 and 32. Transformer type vibrator 35, connected to chute 30 at the midregion thereof, imparts rapid short stroke vibrations thereto. Such vibrations are directed generally along the longitudinal axis of chute 30, indicated by double-ended arrow 38.

Discharge end 32 of chute 30 is positioned just above the upper flight of transfer conveyor belt 40. Delivery conveyor belt 50, in axial alignment with transfer conveyor 40, is positioned so that the rear of delivery conveyor 50 is immediately adjacent to the forward end of transfer conveyor 40. Common motor 45, having output shaft 44, drives sprockets 46 and 56. Sprocket 46, connected to sprocket 47 by chain 48, and acting through electromagnetic clutch 49, drives transfer conveyor 40. Sprocket 56, connected by chain 58 to sprocket 57, acts through magnetic clutch 59 to drive delivery conveyor 50.

The forward or discharge end of delivery conveyor 50 is positioned so that bows B delivered thereby fall into the bucketlike container 61a shown stopped in position to receive bows B delivered by conveyor 50. Container 61a is one of a plurality of uniformly spaced identical containers secured to the loading mechanism conveyor chain 63. Conveyor 63 is operated in a stepped fashion, and each time belt 63 is stopped one of the containers mounted on upper flight 62 thereof is positioned below and at the discharge end of a delivery conveyor 50. After a predetermined number of bows B are loaded into container 61a, either by the single automatic feeding apparatus unit shown in the FIGURE or by a plurality of such units, the contents of container 61a are emptied into a final package (not shown) as the open mouth of the container moves into a downward-facing position.

A first delayed acting photoelectric device 28a, 28b, having a beam transverse to the portion of the bow-feed path defined by secondary shuffler 21, acts to deactivate oscillating mechanism 17 for primary shuffler 15 when an excessive supply of bows B piles up on secondary shuffler 21. Another delayed acting photoelectric device 39a, 39b, having its beam directed transverse to the bow-feed path at transfer region 43 between conveyors 40 and 50, acts to disengage clutch 49 thereby stopping transfer conveyor 40 when there is an excessive buildup of bows B at the transfer region 43. A third or counting photoelectric device 69a, 69b, having a beam thereof directed across the feed path to detect each bow B being delivered by delivery conveyor 50, acts instantaneously to deactuate clutch 59 and thereby stop delivery conveyor 50

Oscillator mechanism 17 is reactivated as soon as the jam detected by photoelectric device 28a, 28b is cleared. Similarly, electromagnetic clutch 49 is reactivated as soon as the jam detected by photoelectric device 39a, 39b is cleared. Reactivation of electromagnetic clutch 59 is controlled by the loading mechanism to which conveyor 50 delivers bows B. That is, when the counting photoelectric device 69a, 69b at the discharge end of each of the automatic feeding apparatus units has operated, conveyor 63 is stepped and thereafter delivery conveyors 50 of all feeding apparatus units commence operation. When only a single automatic feeding apparatus unit is in operation, delivery conveyor 50 continues operation until the counting photoelectric device 69a, 69b detects that a predetermined number of bows B have been delivered by conveyor 50.

Thus, it is seen that bows B are loaded at random into hopper 11 through the open upper end thereof and fall downward to be supported by primary shuffler 15 which reciprocates horizontally to move bows through opening 14 in hopper wall 12 and deliver such bows to secondary shuffler 21. The latter reciprocates and delivers bows B to the widemouthed upper end of tapered sidewall chute 30. The downward inclination of chute 30 combined with the longitudinally directed short rapid stroke vibration thereof moves bows B to the chute discharge end 32 where bows B are delivered to the upper flight of transfer conveyor belt 40. The latter moves bows B to transfer region 43, where the bows B are picked up by the upper flight of delivery conveyor 50. The latter is operated at a faster speed than transfer conveyor 40. Bows B are delivered by conveyor 50 to container 61a on belt 63 of a loading mechanism (only partially shown) for delivery to packaging apparatus (not shown).

Accordingly, it is seen that the instant invention provides novel means for rapidly delivering an accurate count of soft lightweight ornamental articles. Each automatic feeding apparatus unit illustrated in the drawing is relatively narrow, and as a result a plurality of such units mounted side by side will take up relatively little floor space.

Although there has been described a preferred embodiment of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows.

1. Automatic apparatus for feeding articles including a supply section, a transfer conveyor, and a delivery conveyor; said supply section including an input hopper wherein articles are bulk loaded, and a conveyor portion having an output from which articles are delivered to said transfer conveyor at the rear thereof; said delivery conveyor comprising a first continuous movable belt having a first upper flight; said transfer conveyor consisting of a second continuous movable belt means having a second upper flight for moving articles forward and delivering same at a transfer region to said first upper flight; operating means for actuating said first upper flight to deliver articles to a loading mechanism; counting means for controlling said operating means to deactuate said first upper flight after the latter has delivered a predetermined number of articles; and a jam-detecting means to deactivate said second upper flight means upon the occurrence of excessive pileup of articles at said transfer region.

2. Automatic apparatus as set forth in claim 1, in which there is a drive means for operating the first continuous movable belt means at a substantially faster speed than said second continuous movable belt means.

3. Automatic apparatus as set forth in claim 2, in which said first and second continuous movable belt means are axially aligned.

4. Automatic apparatus as set forth in claim 3 in which, at said transfer region, the front of said second continuous movable belt means is positioned adjacent to the rear of said first continuous movable belt means.

5. Automatic apparatus as set forth in claim 4, in which there is another jam-detecting means at said conveyor portion to halt withdrawal of articles from said hopper upon the occurrence of excessive pileup of articles at said conveyor portion.

6. Automatic apparatus as set forth in claim 5, in which the drive means includes a common motor, first and second electromagnetic clutches; said first continuous movable belt means being connectable to said motor; said first electromagnetic clutch interposed between said motor; said counting means controlling operation of said first electromagnetic clutch; said second continuous movable belt means being connectable to said motor through said second electromagnetic clutch; said jam-detecting means controlling operation of said second electromagnetic clutch.

7. Automatic apparatus as set forth in claim 1, in which there is another jam-detecting means at said conveyor portion to halt withdrawal of articles from said hopper upon the occurrence of excessive pileup of articles at said conveyor portion.

8. Automatic apparatus as set forth in claim 7, in which said counting means, said jam-detecting means, and said another jam-detecting means each includes a photoelectric detector with the photoelectric detectors of said jam-detecting means and said another jam-detecting means acting on a delay basis to deactivate said second upper flight means and halt removal of articles from said hopper.

9. Automatic apparatus as set forth in claim 1, in which said conveyor portion, said transfer conveyor, and said delivery conveyor are each elongated and are positioned in axial alignment.

10. Automatic apparatus as set forth in claim 9, in which the bottom wall of said hopper includes a longitudinally reciprocated member; an oscillator mechanism for moving said member forward and rearward with rearward movement being substantially faster than forward movement.

* * * * *